(No Model.) 3 Sheets—Sheet 2.
E. BLOCH.
PHOTOGRAPHIC CAMERA.
No. 595,036. Patented Dec. 7, 1897.
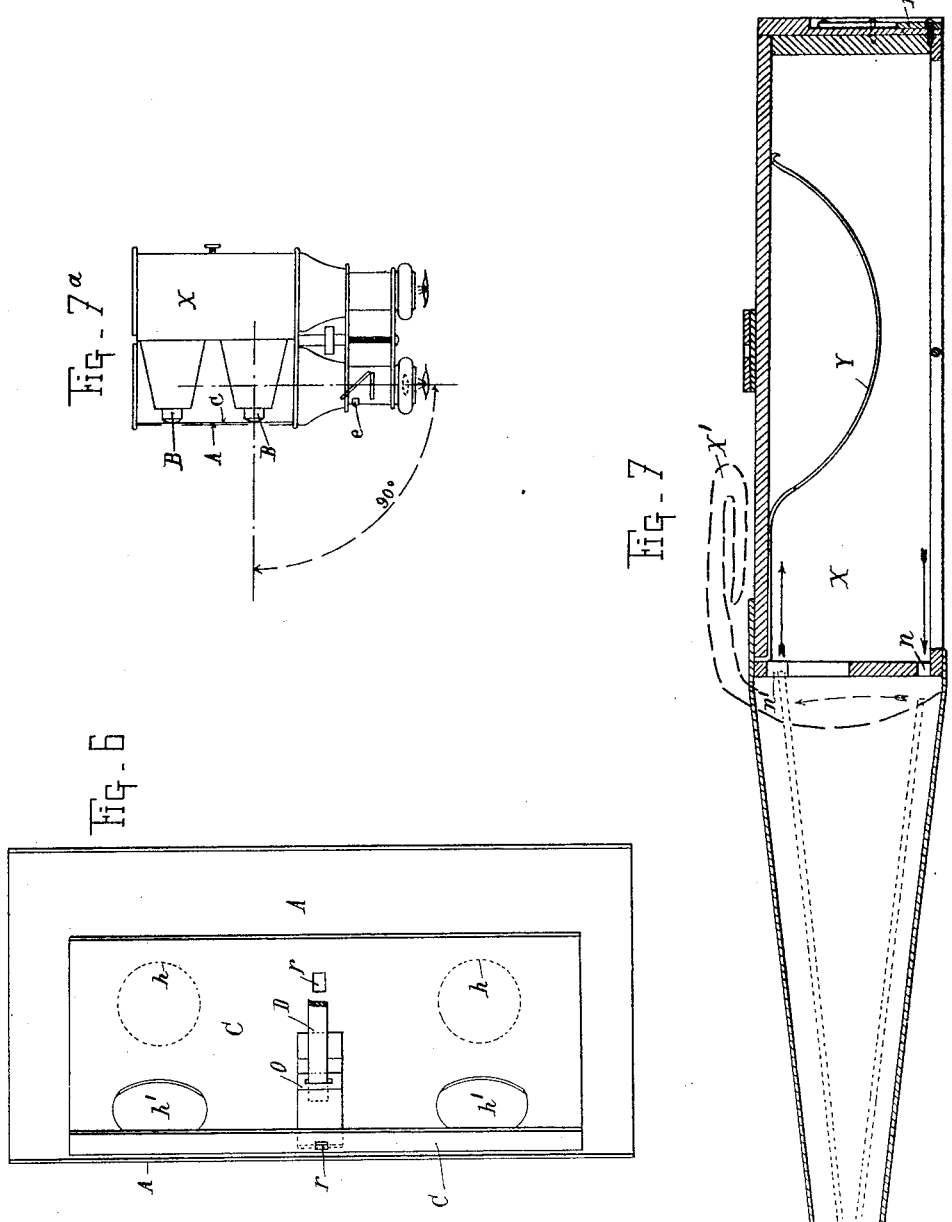
Witnesses.
J. C. Lebret.
O. Block.
Inventor.
Edmond Bloch,
By H. A. deVos.
Attorney.

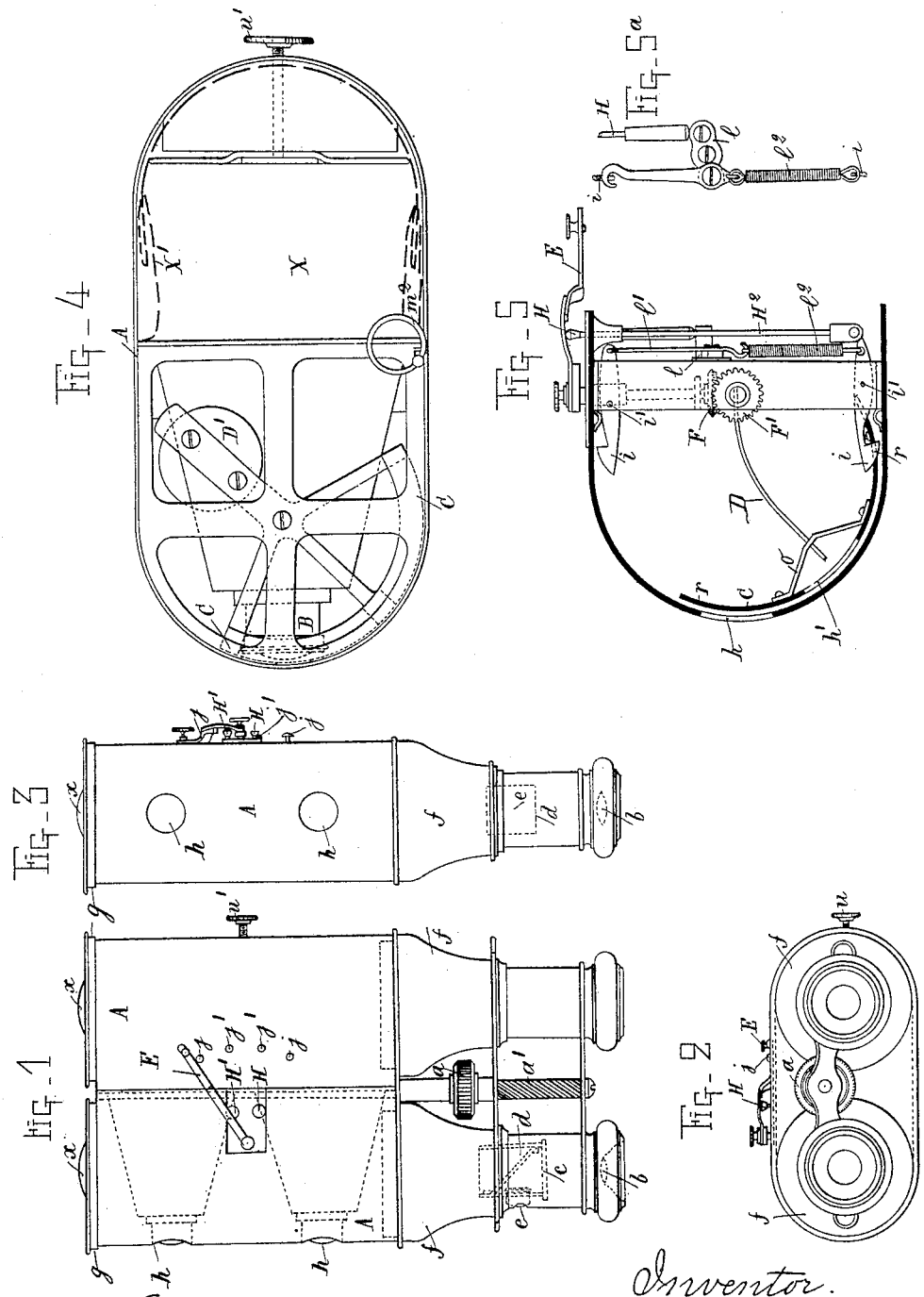

(No Model.) 3 Sheets—Sheet 3.
E. BLOCH.
PHOTOGRAPHIC CAMERA.
No. 595,036. Patented Dec. 7, 1897.
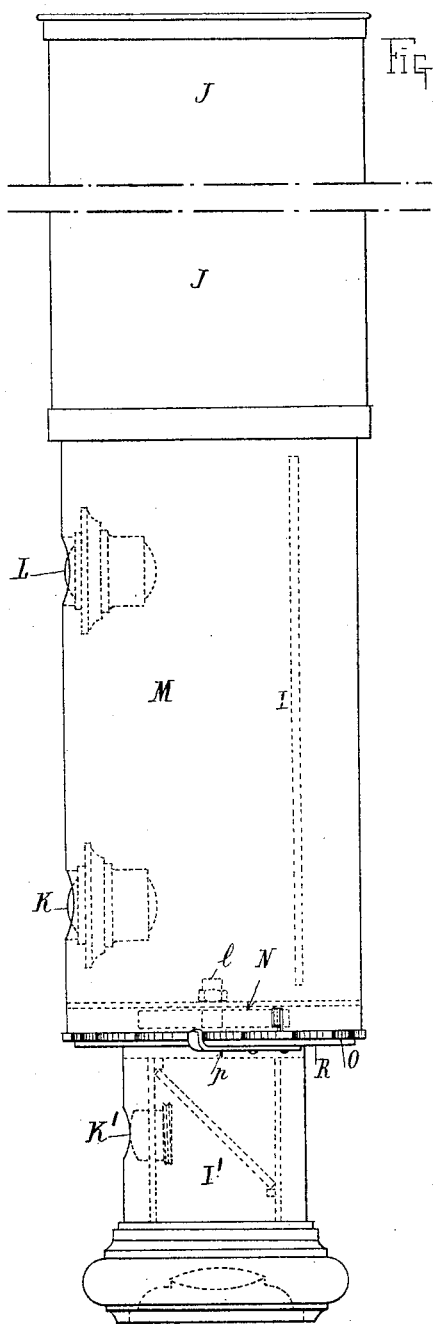
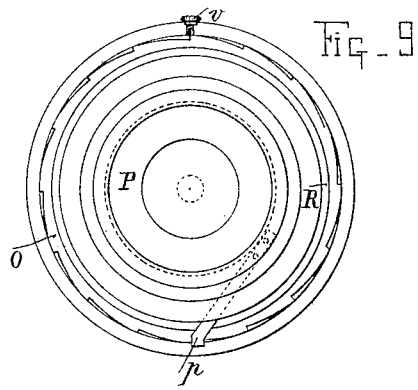
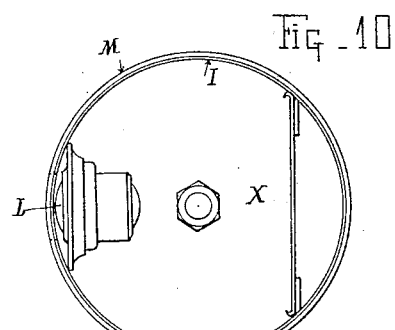
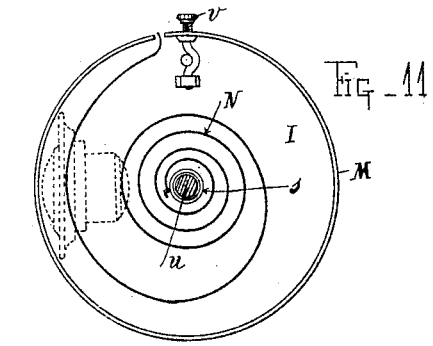
Witnesses
J. C. Lebet.
O. Block.
Inventor.
Edmond Bloch
By H. A. deVos.
Attorney.
THE NORRIS PETERS CO., PHOTO-LITHO., WASHINGTON, D. C.

UNITED STATES PATENT OFFICE.

EDMOND BLOCH, OF PARIS, FRANCE.

PHOTOGRAPHIC CAMERA.

SPECIFICATION forming part of Letters Patent No. 595,036, dated December 7, 1897.

Application filed October 26, 1896. Serial No. 610,059. (No model.) Patented in France April 2, 1896, No. 255,261.

*To all whom it may concern:*

Be it known that I, EDMOND BLOCH, a citizen of the Swiss Republic, residing at Paris, France, have invented certain new and useful Improvements in Photographic Apparatus, (for which I have obtained a patent in France, No. 255,261, dated April 2, 1896,) of which the following is a specification.

My invention relates to a portable photographic apparatus capable of producing a single or stereoscopic picture and made in the form of an opera-glass or spy-glass or telescope, so that when used it is placed before the eye of the operator exactly in the same way as an opera-glass is ordinarily used. Consequently for the operation of my apparatus the oculars are placed before the eyes of the operator, whereby the apparent objectives are of course turned in the opposite direction, while the real photographic lenses are arranged at the side. The apparatus therefore conceals its real purpose, while other devices for the same purpose, which must be reversed when used, so that the smaller side is turned toward the object to be taken, disclose their purpose. With those apparatus the character of a photographic camera cannot be concealed; and, moreover, it is necessary for the operator to focus right before him the object the photograph of which is to be taken, which is often not practicable with peculiar uses of this class of apparatus.

As before said, my apparatus is held exactly as an opera-glass or a spy-glass, and in order to remove as much as possible all suspicion I have placed the lenses at one side, so that the operator seems to look at a different object from that to be taken. The focusing-glass is for the same purpose placed at the same side and sends the image by the reflection to the oculars. When not in use, the lenses are entirely covered by the shutter, so that at a slight distance the apparatus does not look at all as a photographic apparatus. The arrangement of the lenses at the side and the form of opera-glasses or spy-glasses has enabled me to obtain stereoscopic or single pictures, as desired by the operator.

In order to better explain my apparatus, I have illustrated the device in the annexed drawings, making a part of this specification, and wherein—

Figure 1 is a plan view of a camera in the form of an opera-glass, the same being in the position for use. Fig. 2 is an end view of the same, looking at the oculars. Fig. 3 is a side view looking at the lenses. Fig. 4 is an end view showing the dark chamber and part of the shutter and one of its counterweights and the plate-chamber. Figs. 5 and $5^a$ show, respectively, a side and front view of the mechanism for releasing the shutter. Fig. 6 is a front view of the shutter. Fig. 7 shows a longitudinal section of the plate-chamber and the transfer-back. Fig. $7^a$ shows a schematic view of the opera-glass. Fig. 8 illustrates an apparatus in the form of a spy-glass; Fig. 9, an end view of the same. Fig. 10 shows an inside view of the lens-tube serving as plate-chamber; Fig. 11, an end view of the lens-tube, showing the spring operating the exterior shutter.

As shown in Figs. 1, 2, 3, and $7^a$, the apparatus in the shape of an opera-glass can be regulated by hand by means of the little wheel $a$ and the screw $a'$. One tube (the left one on the drawings) is adapted to be operated by means of a sight formed of a lens $b$, forming the ocular, a ground glass $c$, an oblique mirror $d$, and a small lens $e$, which gives the visual ray an angle of ninety degrees to the axis of the tube. The lens $b$ arranged in the ocular has for its purpose to enlarge the image on the ground glass.

The two parts $f$ are fastened in any suitable way in an envelop or case A, closed at its outer end, but there provided with two rings $g$ and two black glasses $x$ to give the device the appearance of a real opera-glass.

Within the envelop A and in front of the openings $h$ are placed the two lenses B, whereby a sufficient space is provided to allow the shutter C to slide to and fro. This shutter is formed of a curved metallic plate provided with two openings $h'$, corresponding with the openings $h$ in the envelop. Said shutter is also provided at its top and lower part with a stop-hole $r$, into which enters a dog $i$, pivoted at $i'$, when the shutter arrives at the end of its stroke. As will be readily understood, the shutter C is always in engagement with one of these dogs, and after each exposure it is sufficient to increase or decrease the torsion of the spring D by turning the handle E, which is stopped against one of the projecting studs $j$ $j'$, in order to have the next exposure shorter or longer. In Fig. 1, for instance, I have shown the handle E in a position for a very short exposure. For a longer exposure the handle is stopped against one of the studs $j'$, which will cause the spring D to become less stretched and consequently will impart a smaller speed to the shutter.

The variation of the torsion of the spring D by the handle E is obtained by means of two conical pinions F F'. The latter is keyed upon an axle in which is fixed one end of the spring D, and the other end of said spring is engaged in a piece $o$, fastened to the shutter, so as to be enabled to impart to the shutter both an upward and a downward motion. When the spring is stretched, as shown in Fig. 5, and exposure is to be made, it is sufficient to push that one of the buttons H or H' not covered by the handle E. The pressure upon the button H will act directly upon the lower dog $i$ by means of the rod $H^2$ and disengage the same, thus enabling the spring D and the counterweights D', Fig. 4, to move the shutter until the upper dog $i'$ enters into the opening $r$. For the next motion of the shutter the handle E is moved toward the button H, and the button H', thus uncovered, is pushed inward. When the button H' is pushed, a lever $l$ is acted upon, (see Fig. $5^a$,) acting, by means of a hooked rod $l'$, upon the upper dog $i'$ and thus releasing the shutter. The lower dog $i$ is constantly kept under tension by means of a spring $l^2$, which is fixed at its other end to the rod $l'$, which in turn is connected with an end of the upper dog $i'$.

The counterweights D' keep the shutter C normally at the middle position, so that the upward and downward motion will always be performed with equal speed.

The plate-chamber, Figs. 4 and 7, is formed of a box X, shaped as a parallelopipedon closed at one end by a bolted door $m$. The other end is covered by the flexible transfer-bag X' and is provided with two apertures $n$ and $n'$. The aperture $n$ serves as a passage for the exposed plate, which is withdrawn from the chamber by means of a ring fixed to a sliding blade and provided at its other end with a projection $m^2$, adapted to carry along the plate. The plate thus withdrawn from the chamber comes into the flexible bag X' and describes a small arc of a circle in order enter again through the opening $n'$ into the chamber behind the fresh plates.

All plates—twelve in number—are continuously pushed toward the lenses by a suitable spring Y. A thirteenth plate, of metal or any other suitable opaque material adapted to prevent rays of light from penetrating into the chamber, is on top when the magazine is charged, so that this may be done in full daylight. When the twelve plates have been exposed, the thirteenth plate will again cover the other plates, so that they may also be safely removed.

The screw $u'$ has for its only purpose to maintain the chamber X in place and against the dark chamber.

If it is desired to take a single picture with the before-described apparatus, one of the openings $h$ of the envelop A is covered with the hand, while for stereoscopic pictures both remain free.

In Figs. 8, 9, 10, and 11 the same principle is applied to a spy-glass formed of two telescoping tubes I and J, the tube I being equipped with the ocular and sight K', the latter being housed in the tube I', of a smaller diameter than tube I. The tube I, in which are arranged the lenses K and L, is surrounded by a shell M, which performs the functions of a shutter by a rotary motion derived from a spiral spring N. The shutter is of course provided with two openings, and the spring N is connected at one end to the shutter and at the other end to the hub $s$ of a toothed wheel O, which turns freely on a fixed shaft $u$, connecting the tubes I and I'. The shutter can thus be brought in condition for operation by turning it by means of any suitable arrangement, as shown, for instance, at $v$ in Fig. 11. At its lower end the tube I' is provided with a circular plate R, upon which is arranged a stop-spring $p$, the free end of which engages with one of the teeth of the wheel O. This wheel is adapted to regulate the stroke and the speed of the tube M, which acts as a shutter, and consequently the time of exposure.

In the first-described arrangement, Figs. 1 to 7, the space left by the dark chamber and the mechanism in the shell A and in the tube I of Figs. 8 to 11 serves as a storing-place for the plates.

Having now described my invention, what I claim, and desire to secure by Letters Patent, is—

1. In a photographic apparatus, the combination of a case formed as a binocular, a storage-compartment for sensitized plates in one tube of the binocular, main parallel lenses in the other tube of the binocular having their focal axes perpendicular to the longitudinal axis of the binocular, a finder and an ocular as described, a shutter C formed as a section of a cylinder and rotating about the longitudinal axis of said last-named tube, an adjustable spring adapted to throw said shutter at varying rapidity, and dogs adapted to hold the shutter at the extreme limits of its motion in either direction, substantially as described.

2. The combination in photographic apparatus, of a case shaped as a binocular, lenses $h$, $h$ in one tube of the binocular with their focal axes perpendicular to the longitudinal axes of said binoculars, a storage-compartment for sensitized film in the other tube of the binocular directly behind said lenses $h$, $h$, a flexible pocket X' at one end of said compartment, a separating-wall between the compartment and the pocket having openings at the top and bottom for the outward and inward passage of the sensitized plates, a spring adapted to clamp the plates in said compartment, and a slide adapted to transfer the plates from the compartment to the pocket through one of said openings, substantially as described.

In testimony that I claim the foregoing I have hereunto set my hand this 5th day of September, 1896.

EDMOND BLOCH.

Witnesses:
EMILE COUCHOUD,
H. T. SMITH.